(12) United States Patent
Koga

(10) Patent No.: US 8,976,461 B2
(45) Date of Patent: *Mar. 10, 2015

(54) LENS BARREL AND IMAGING DEVICE

(75) Inventor: Akira Koga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,081

(22) Filed: Jul. 30, 2012

(65) Prior Publication Data

US 2013/0033770 A1  Feb. 7, 2013

(30) Foreign Application Priority Data

Aug. 3, 2011 (JP) ................. 2011-169854
Jun. 6, 2012 (JP) ................. 2012-128549

(51) Int. Cl.
*G02B 15/14* (2006.01)
*G02B 7/02* (2006.01)
(Continued)

(52) U.S. Cl.
CPC *G02B 7/102* (2013.01); *G02B 7/04* (2013.01); *G02B 7/10* (2013.01); *G02B 15/14* (2013.01); *G02B 15/16* (2013.01); *G03B 3/00* (2013.01); *G03B 3/10* (2013.01); *G02B 7/02* (2013.01);
(Continued)

(58) Field of Classification Search
CPC .......... G02B 7/00; G02B 7/021; G02B 7/023; G02B 7/102; G02B 7/02; G02B 7/04; G02B 7/022; G02B 15/14; G02B 15/16; G02B 15/161; G03B 3/10; G03B 5/00; G03B 2205/0046; G03B 2205/0053; G03B 2205/0084; G03B 17/00; G03B 17/04

USPC ........... 359/822–826, 694–705; 396/61, 133, 396/144, 427, 448, 72, 73, 75, 77, 79–81, 396/85, 89; 348/143, 151, 340, 373, 374, 348/E5.024, E5.025, E5.028, 360, 345
See application file for complete search history.

(56) References Cited

U.S. PATENT DOCUMENTS 4,456,356 A  6/1984 Okabe
4,917,846 A  4/1990 Takase et al.
(Continued)

FOREIGN PATENT DOCUMENTS

JP  S62-259816 A  11/1987
JP  H05-034563 A  2/1993
(Continued)

OTHER PUBLICATIONS

Non-final Office Action for the related U.S. Appl. No. 13/561,080, issued Sep. 16, 2013.
(Continued)

*Primary Examiner* — Loha Ben
(74) *Attorney, Agent, or Firm* — Shinjyu Global IP

(57) ABSTRACT

The lens barrel includes a first frame, a second frame configured to be rotatably supported by the first frame, a drive actuator that is disposed on the inside of the second frame, and a transmission mechanism disposed on the inside of the second frame and configured to transmit the drive force of the drive actuator to the second frame. The imaging device includes the above-mentioned lens barrel and an imaging element that converts an optical image formed by this lens barrel into image data.

9 Claims, 10 Drawing Sheets

(51) Int. Cl.
  *G02B 7/10* (2006.01)
  *G02B 7/04* (2006.01)
  *G02B 15/16* (2006.01)
  *G03B 3/00* (2006.01)
  *G03B 3/10* (2006.01)
  *G02B 7/08* (2006.01)
  *G03B 5/00* (2006.01)

(52) U.S. Cl.
  CPC ............... *G02B 7/021* (2013.01); *G02B 15/161* (2013.01); *G03B 5/00* (2013.01); *G03B 2205/0046* (2013.01); *G03B 2205/0053* (2013.01); *G02B 7/08* (2013.01)
  USPC ........... 359/696; 359/694; 359/823; 359/826; 396/133; 396/144

(56) References Cited

U.S. PATENT DOCUMENTS

| | | | |
|---|---|---|---|
| 5,222,407 A | 6/1993 | Sekiguchi | |
| 5,592,250 A | 1/1997 | Shimizu | |
| 5,701,208 A | 12/1997 | Sato et al. | |
| 6,008,954 A * | 12/1999 | Shintani et al. | 359/704 |
| 6,434,331 B1 | 8/2002 | Araoka et al. | |
| 6,498,624 B1 | 12/2002 | Ogura et al. | |
| 6,580,571 B2 | 6/2003 | Sasaki et al. | |
| 7,099,573 B2 | 8/2006 | Ikemizo | |
| 7,280,287 B2 * | 10/2007 | Yamane | 359/698 |
| 7,680,409 B2 * | 3/2010 | Kurosawa | 396/133 |
| 7,690,851 B2 * | 4/2010 | Yamane et al. | 396/427 |
| 7,758,261 B2 * | 7/2010 | Ohkuma | 396/457 |
| 7,792,422 B2 | 9/2010 | Mori | |
| 7,864,241 B2 | 1/2011 | Iwasaki | |
| 7,898,745 B2 * | 3/2011 | Matsui et al. | 359/694 |
| 7,929,049 B2 * | 4/2011 | Yamane et al. | 348/373 |
| 8,031,418 B2 * | 10/2011 | Shiga | 359/824 |
| 8,264,556 B2 * | 9/2012 | Hasuda | 348/208.7 |
| 8,405,922 B2 * | 3/2013 | Terahara | 359/826 |
| 8,665,540 B2 * | 3/2014 | Ito | 359/823 |
| 8,693,861 B2 * | 4/2014 | Koga | 396/144 |
| 8,712,230 B2 * | 4/2014 | Koga | 396/144 |
| 8,861,104 B2 * | 10/2014 | Ito | 359/823 |
| 2009/0002847 A1 | 1/2009 | Nakada et al. | |
| 2010/0013939 A1 | 1/2010 | Ohno et al. | |
| 2010/0014172 A1 | 1/2010 | Koyama et al. | |
| 2010/0060995 A1 | 3/2010 | Yumiki et al. | |
| 2010/0165493 A1 | 7/2010 | Fukino et al. | |
| 2012/0188660 A1 | 7/2012 | Fahlbusch et al. | |
| 2012/0200768 A1 * | 8/2012 | Ito | 348/374 |
| 2013/0044381 A1 * | 2/2013 | Ito | 359/823 |
| 2013/0077949 A1 * | 3/2013 | Koga | 396/144 |
| 2013/0100540 A1 * | 4/2013 | Koga | 359/700 |

FOREIGN PATENT DOCUMENTS

| | | |
|---|---|---|
| JP | H08-110456 A | 4/1996 |
| JP | 2000-304999 A | 11/2000 |
| JP | 2003-057522 A | 2/2003 |
| JP | 2010-038932 A | 2/2010 |

OTHER PUBLICATIONS

The Official Communication for co-pending U.S. Appl. No. 13/561,083, issued Feb. 7, 2014.

The Notice of Allowance from related U.S. Appl. No. 13/561,080 dated Oct. 7, 2014.

* cited by examiner

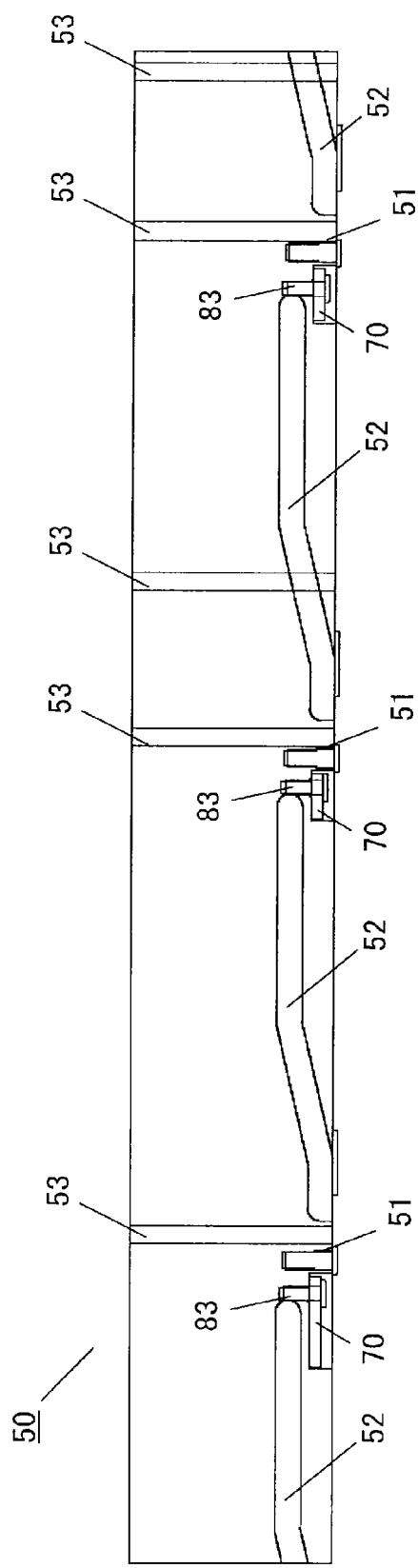
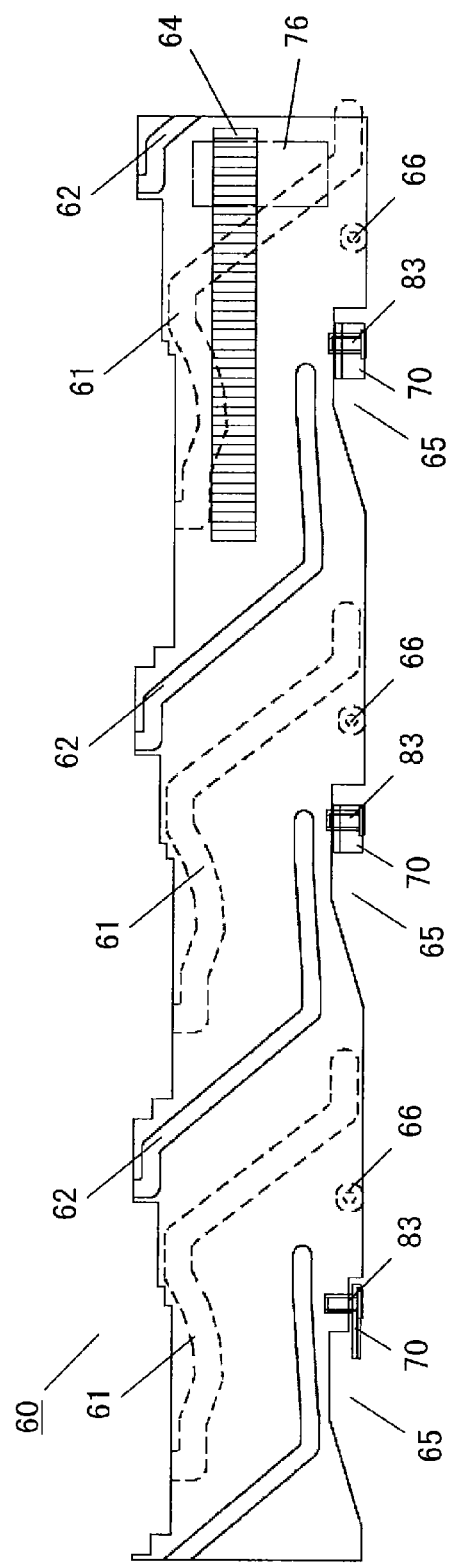
FIG. 7A
FIG. 7B

LENS BARREL AND IMAGING DEVICE

CROSS-REFERENCE TO RELATED APPLICATIONS

This application claims priority under 35 U.S.C. §119 to Japanese Patent Application No. 2011-169854, filed on Aug. 3, 2011 and Japanese Patent Application No. 2012-128549, filed on Jun. 6, 2012. The entire disclosure of Japanese Patent Application No. 2011-169854 and Japanese Patent Application No. 2012-128549 are hereby incorporated herein by reference.

BACKGROUND

1. Technical Field

The technology disclosed herein relates to a telescoping lens barrel.

2. Background Information

Imaging devices that produce image data about a subject have rapidly gained popularity in recent years. A lens barrel for adjusting the focal distance is mounted in these imaging devices. Examples of known imaging devices include cameras with an integrated lens and those with an interchangeable lens. A lens barrel is built into an integrated type of camera. A camera with an interchangeable lens has a camera body and a lens barrel that can be mounted to the camera body.

A conventional lens barrel is disclosed in Japanese Laid-Open Patent Application H5-34563, for example. With this lens barrel, the focal distance can be adjusted, or the desired main subject can be focused on, by moving a lens group along the optical axis direction. A motor and a plurality of transmission gears are disposed in a substantially circular shape around the optical axis.

SUMMARY

With respect to the lens barrel configuration discussed above, it has been discovered that there is a limit to how much the total length of the lens barrel can be reduced to achieve a more compact size, because the motor, the plurality of transmission gears, and a cam barrel are disposed aligned along the optical axis direction.

It is an object of the technology disclosed herein to provide a telescoping lens barrel that can be made more compact in its stowed state.

The lens barrel disclosed herein includes a first frame, a second frame, a drive actuator, and a transmission mechanism. The second frame is configured to be rotatably supported by the first frame. The drive actuator is disposed on the inside of the second frame. The transmission mechanism is disposed on the inside of the second frame and is configured to transmit the drive force of the drive actuator to the second frame.

With the above configuration, the drive actuator and the transmission mechanism can be efficiently disposed on the inside of the second frame, and the second frame can be disposed on the camera body side, so the lens barrel can be more compact.

Also, a similar reduction in size can be obtained with an imaging device comprising this lens barrel.

The technology disclosed herein makes it possible to provide a lens barrel and an imaging device that can be made more compact.

BRIEF DESCRIPTION OF THE DRAWINGS

Referring now to the attached drawings, which form a part of this original disclosure:

FIG. 7A is an inner peripheral development view of an outer frame 50;
FIG. 7B is an inner peripheral development view of a cam frame 60.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

1. External Appearance

Figure 1:
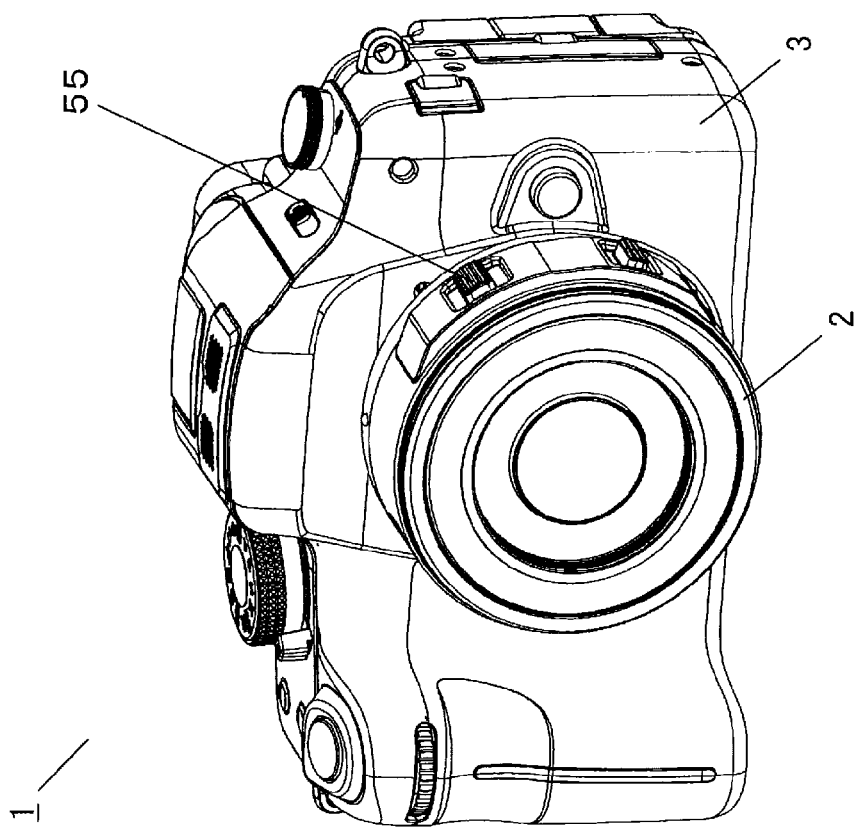
FIG. 1 is an oblique view of an imaging device 1.

FIG. 1 is an oblique view of an imaging device 1. The imaging device 1 is an interchangeable lens type of digital camera, and mainly includes a camera body 3 and a lens barrel 2 that is removably mounted to the camera body 3.

Figure 2:
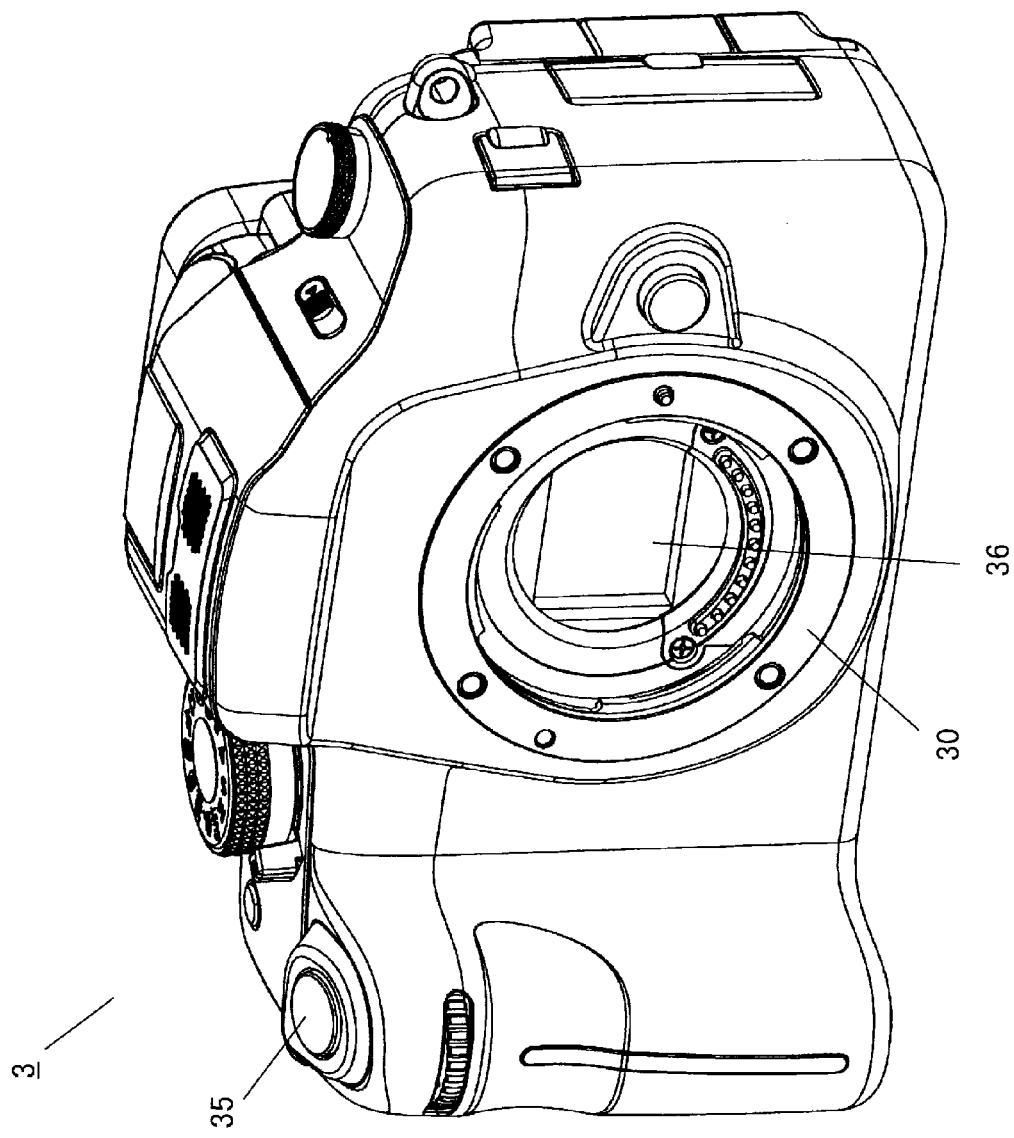
FIG. 2 is an oblique view of a camera body 3.

FIG. 2 is an oblique view of the camera body 3 when the lens barrel 2 has been removed. The camera body 3 includes a body mount 30, which is the portion where the lens barrel 2 is attached, an imaging element 36 that captures an optical image formed by the lens barrel 2 and converts it into image data, and a shutter button 35.

Figure 3:
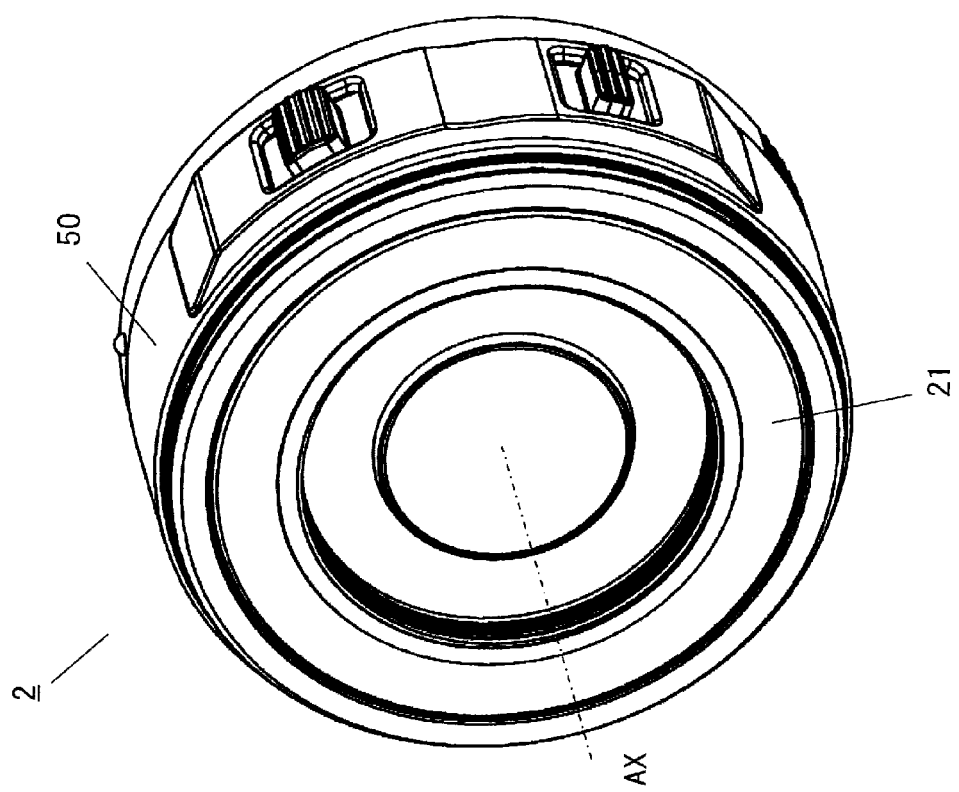
FIG. 3 is an oblique view of a lens barrel 2.

FIG. 3 is an oblique view of the lens barrel 2. FIG. 3 is an oblique view as seen from the subject side. The lens barrel 2 has the outer frame 50 on its outermost periphery. The lens barrel 2 also supports a lens with a first lens frame 21. In FIG. 3, an optical axis AX is displayed as the optical axis of the lens. The "optical axis direction" is a direction along the optical axis AX, and is a direction that is parallel to the optical axis AX. A zoom lever 55 is provided to the outer peripheral part of the outer frame 50. The user can adjust the focal distance by operating the zoom lever 55.

2. Vertical Cross Section of Lens Barrel 2

Figure 4:
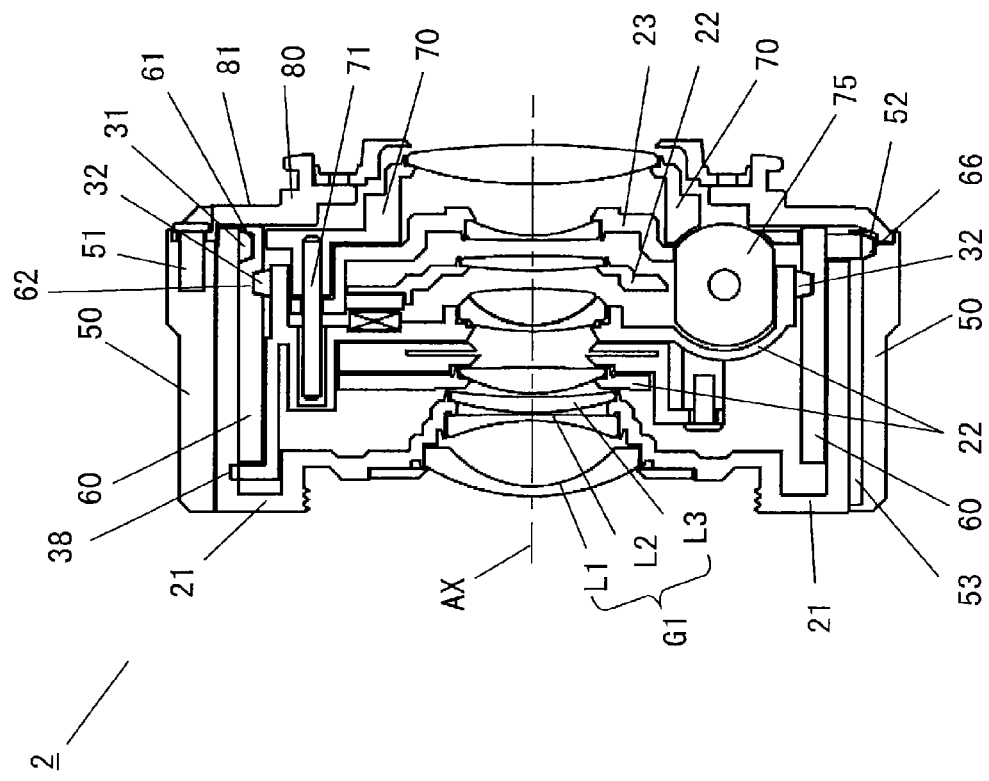
FIG. 4 is a cross section of the lens barrel 2 in its stowed state.

FIG. 4 is a vertical cross section of the lens barrel 2 when the cam frame 60 has moved all the way to the lens mount 80 side.

The outer frame 50 is fixed to the lens mount 80. The outer frame 50 supports the cam frame 60 rotatably and retractably along the optical axis direction. The outer frame 50 is a substantially cylindrical member. The fixed frame 70 is fixed to the lens mount 80.

The outer frame 50 is fixed by linking portions 51 (such as screws) to the lens mount 80. The linking portions 51 are inserted a specific length into the outer frame 50. More specifically, screws of a specific length are threaded into female threads formed inside the outer frame 50. Cam grooves 52 and rectilinear grooves 53 are formed in the inner peripheral face of the outer frame 50.

The cam frame 60 includes cam followers 66 on its outer peripheral face. The cam followers 66 engage with the cam grooves 52 formed in the inner peripheral face of the outer frame 50. Consequently, when the cam frame 60 rotates with respect to the outer frame 50, the cam followers 66 move along the cam grooves 52. As a result, the cam frame 60 advances and retracts with respect to the outer frame 50. First cam grooves 61 are formed in the outer peripheral face of the cam frame 60. Second cam grooves 62 are formed in the inner peripheral face of the cam frame 60.

As shown in FIG. 4, when the cam frame 60 has moved all the way to the lens mount 80 side, the end of the cam frame 60 on the lens mount 80 side is disposed within a region, in which the linking portions 51 are disposed, along the optical axis direction of the lens. Specifically, the linking portions 51 and the cam frame 60 are disposed so that the linking portions 51 overlap the end of the cam frame 60 on the lens mount 80 side along the optical axis direction of the lens. In other words, the end of the cam frame 60 on the lens mount 80 side is included in the region in which the linking portions 51 are disposed as seen in a direction perpendicular to the optical axis AX of the lens. That is, in FIG. 4, the end of the cam frame 60 on the lens mount 80 side is disposed more to the lens mount 80 side than the distal ends of the linking portions 51.

The cam frame 60 supports the first lens frame 21. First cam followers 31 are formed in the first lens frame 21. The first cam followers 31 engage with the first cam grooves 61. Consequently, when the cam frame 60 rotates with respect to the first lens frame 21, the first cam followers 31 move along the first cam grooves 61. As a result, the first lens frame 21 advances and retracts with respect to the cam frame 60. When the cam frame 60 has moved all the way to the lens mount 80 side, at least part of the first cam followers 31 of the first lens frame 21 is disposed within the region in which the linking portions 51 are disposed along the optical axis direction of the lens. The first lens frame 21 supports lenses L1, L2, and L3.

The cam frame 60 supports a second lens frame 22. Second cam followers 32 are formed on the second lens frame 22. The second cam followers 32 engage with the second cam grooves 62. Consequently, when the cam frame 60 rotates with respect to the second lens frame 22, the second cam followers 32 move along the second cam grooves 62. As a result, the second lens frame 22 advances and retracts with respect to the cam frame 60. The second lens frame 22 supports lenses L4, L5, L6, and L7. An aperture unit 42 is attached to the second lens frame 22, and moves integrally with the second lens frame 22 along the optical axis direction.

The cam frame 60 has a cylindrical main body. The cam frame 60 is disposed so that at least part of the main body of the cam frame 60 overlaps the contact face 81 as seen from the subject side.

The fixed frame 70 supports a third lens frame 23 via a shaft 71. The third lens frame 23 is driven along the optical axis direction by a focus motor (not shown). The third lens frame 23 supports a lens L8. The fixed frame 70 supports a lens L9. A stepping motor, for example, is used as the focus motor.

A motor 75 is fixed to the fixed frame 70. The motor 75 is disposed on the inner peripheral side of the cam frame 60. The motor 75 is a drive means for rotating the cam frame 60. At least part of the motor 75 is disposed within the region in which the linking portions 51 are disposed along the optical axis direction of the lens.

In this embodiment, an example was given in which the optical system was made up of four groups of lenses, but the present technology is not limited to this.

Figures 5, 6:
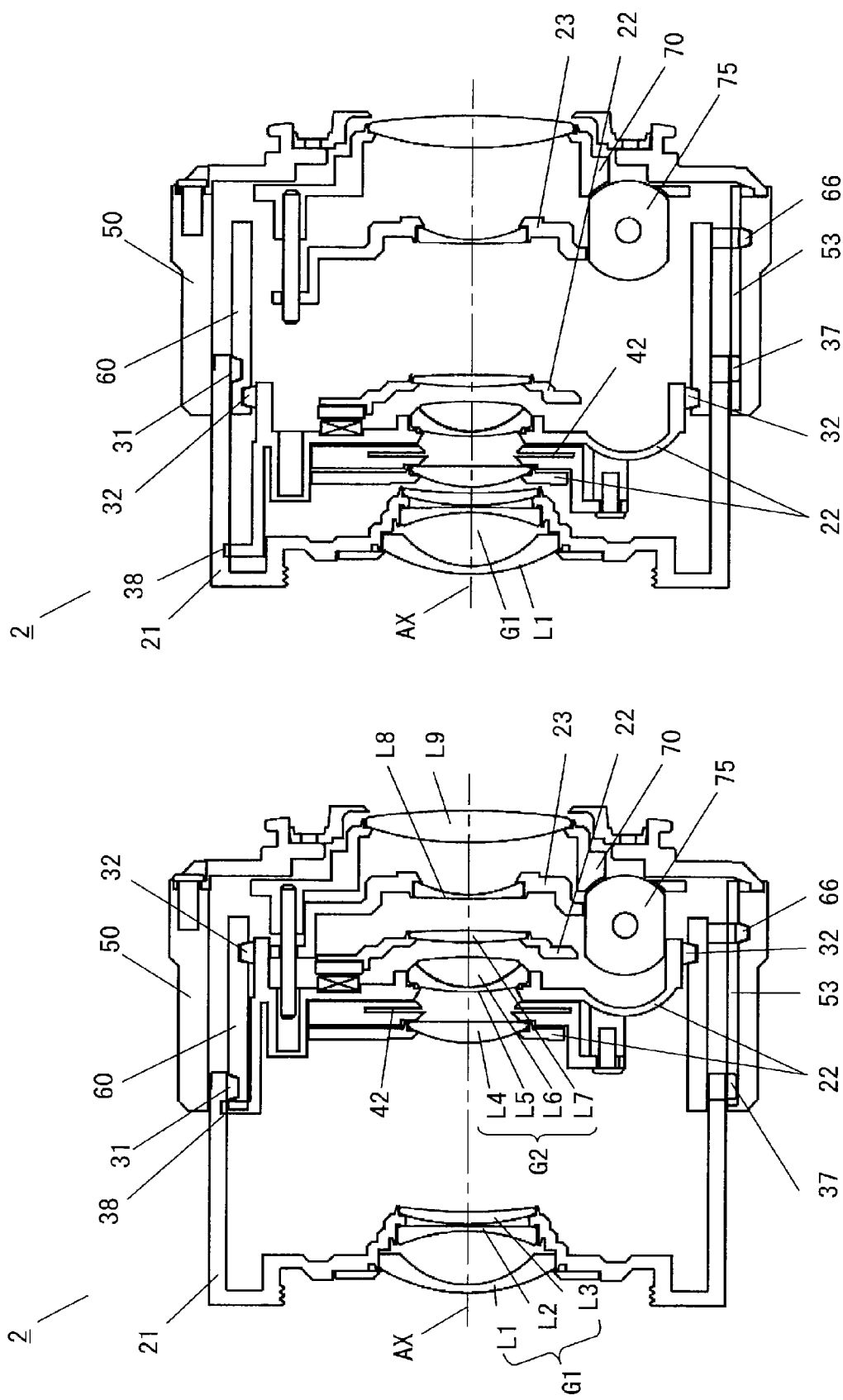
FIG. 5 is a cross section of the lens barrel 2 at the wide angle end.
FIG. 6 is a cross section of the lens barrel 2 at the telephoto end.

FIG. 5 is a cross section showing the situation in imaging at the wide angle end, while the lens barrel 2 is in use. Since the lens barrel 2 is being used, the cam followers 66 are located more to the subject side than in the state shown in FIG. 4. Accordingly, the cam frame 60 is extended with respect to the outer frame 50.

FIG. 6 is a cross section showing the situation in imaging at the telephoto end, while the lens barrel 2 is in use. As shown in FIGS. 5 and 6, the state of zooming is varied by adjusting the positions of the first lens frame 21 and the second lens frame 22.

3. Cam Grooves

FIG. 7A is a development view of the inner periphery of the outer frame 50. The rectilinear grooves 53 guides so that the first lens frame 21 does not rotate. Rectilinear protrusions 37 formed on the first lens frame 21 engage with the rectilinear grooves 53. Specifically, the rotation of the first lens frame 21 is restricted by the outer frame 50. The cam grooves 52 are provided at three locations in the inner peripheral face of the outer frame 50. The rectilinear grooves 53 are provided at five locations in the inner peripheral face of the outer frame 50.

Screws 83 pass through the lens mount 80 and the fixed frame 70 and are inserted into the outer frame 50. This fixes the fixed frame 70, the lens mount 80, and the outer frame 50 to each other. The screws 83 and the linking portions 51 are each provided at three places.

As is clear from FIG. 7A, the ends of the cam grooves 52 on the lens mount 80 are located more to the lens mount 80 side than the distal ends of the linking portions 51. In other words, the region (range) of the cam grooves 52 used during lens stowage is formed more to the lens mount 80 side than the distal ends of the linking portions 51. Consequently, when the cam frame 60 has moved all the way to the lens mount 80 side, the end of the cam frame 60 on the lens mount 80 side is disposed within the region in which the linking portions 51 are disposed along the optical axis direction of the lens. Specifically, in this case the linking portions 51 and the cam frame 60 are disposed so that the linking portions 51 overlap the end of the cam frame 60 on the lens mount 80 side along the optical axis direction of the lens. In other words, when the cam frame 60 has moved all the way to the lens mount 80 side, the end of the cam frame 60 on the lens mount 80 side is included in the region in which the linking portions 51 are disposed as seen in a direction perpendicular to the optical axis AX of the lens. Also, the three linking portions 51 are respectively disposed between the three cam grooves 52 in the peripheral direction, and do not interfere with the cam grooves 52.

FIG. 7B is a development view of the inner periphery of the cam frame 60. The second cam grooves 62 and a gear portion 64 are provided to the inner peripheral face of the cam frame 60. The gear portion 64 meshes with a gear provided to a transmission mechanism 76, and transmits the drive force of the motor 75 to the cam frame 60.

The first cam grooves 61 and the cam followers 66 are provided to the outer peripheral face of the cam frame 60.

Cut-outs 65 are provided to the end of the cam frame 60 on the lens mount 80 side. The cut-outs 65 are provided at locations at the end of the cam frame 60 on the lens mount 80 side. In the location, the cut-outs 65 do not interfere with the first cam grooves 61 and the second cam grooves 62. Specifically, the cut-outs 65 are disposed at locations that are away from the first cam grooves 61 in the peripheral direction, and are disposed at locations that are away from the second cam grooves 62 along the optical axis direction.

4. Relation Between Cam Frame 60 and Fixed Frame 70

Figure 8A:
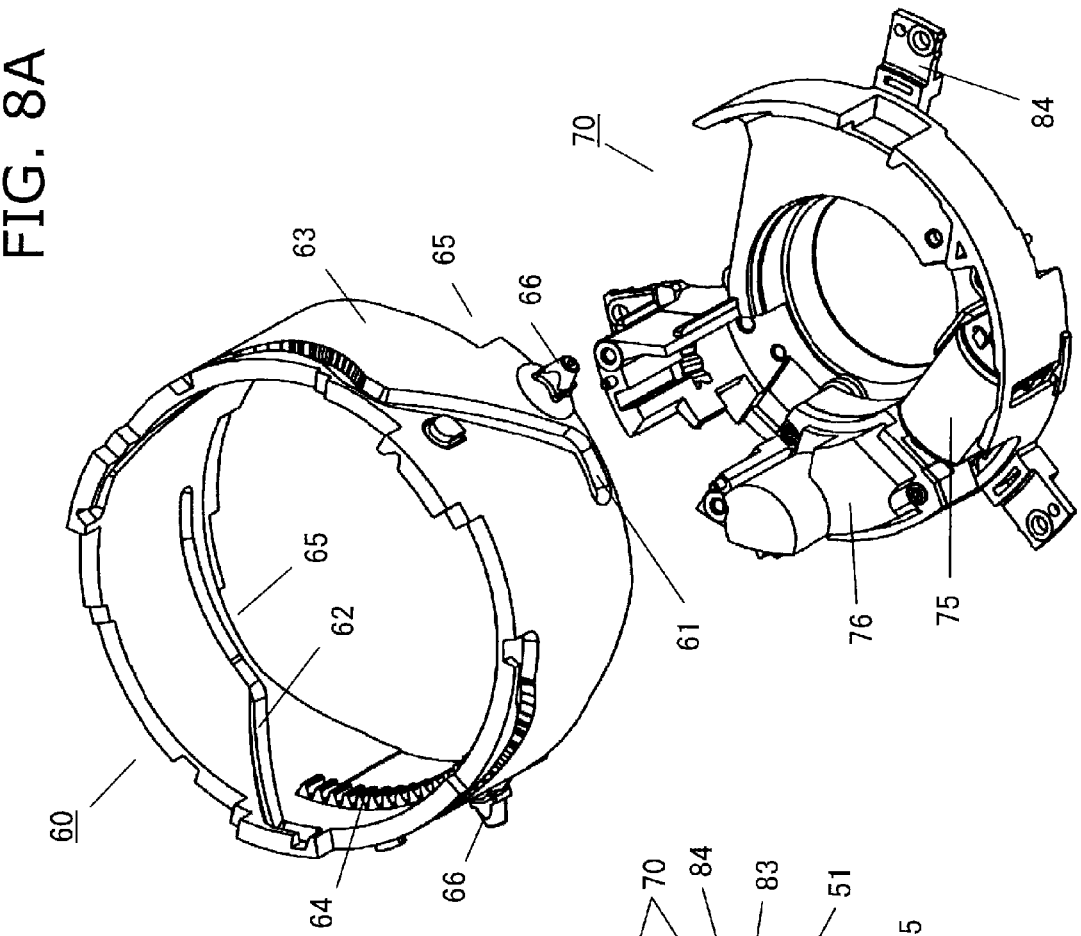
FIG. 8A is an oblique view of the cam frame 60 and a fixed frame 70.

FIG. 8A is an exploded oblique view of the cam frame 60 and the fixed frame 70. The fixed frame 70 includes fixing portions 84 extending from the inner peripheral side toward the outer peripheral side. The fixing portions 84 are provided at three places around the outer periphery. The linking portions 51 and the fixing portions 84 are each disposed at three places, substantially equidistantly spaced apart in the peripheral direction. The motor 75 and the transmission mechanism 76 are mounted to the inner periphery of the fixed frame 70. The transmission mechanism 76 transmits the rotational drive force of the motor 75 to the cam frame 60.

Figure 8B:
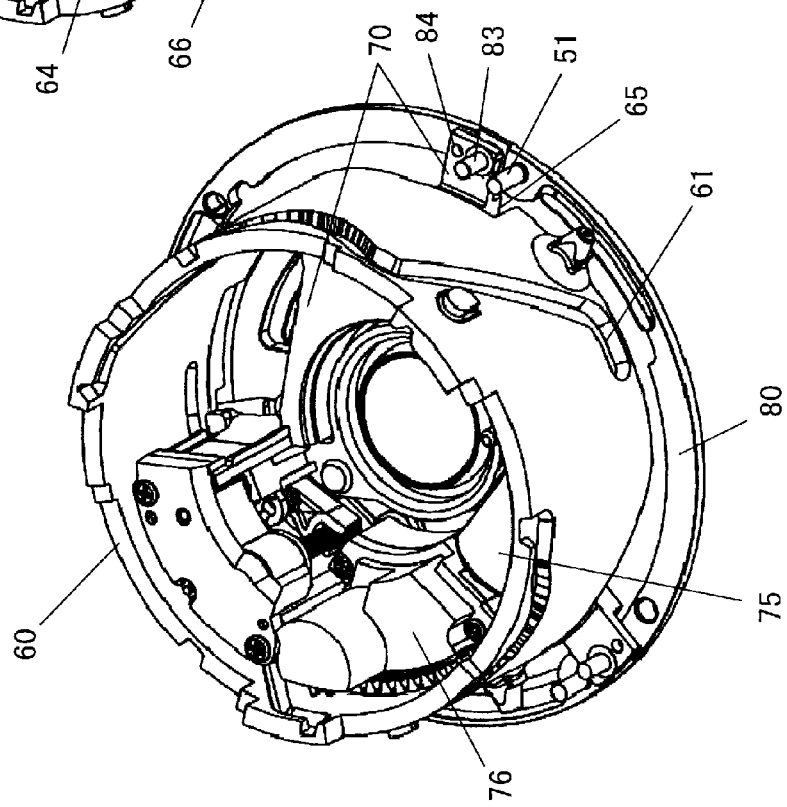
FIG. 8B is an oblique view of the interior of the lens barrel 2.

FIG. 8B is an oblique view of the state when the cam frame 60 and the fixed frame 70 have been assembled on the lens mount 80. FIG. 8B shows the cam frame 60 when it is all the way on the lens mount 80 side. In this state, the cut-outs 65 are located at the places where the fixing portions 84 are disposed. Consequently, the fixing portions 84 can be disposed on the outer peripheral side of the cam frame 60 without interfering with the cam frame 60. The lens mount 80, the fixing portions 84, and the outer frame 50 are fixed by the screws 83, but since their fixed portions are on the outer peripheral side of the cam frame 60. Even when the cam frame 60 has moved all the way to the lens mount 80 side, the end of the cam frame 60 on the lens mount 80 side is disposed within the region in which the screws 83 are disposed along the optical axis direction of the lens. Accordingly, the cam frame 60 can be stowed in a more compact state.

Figure 9B:
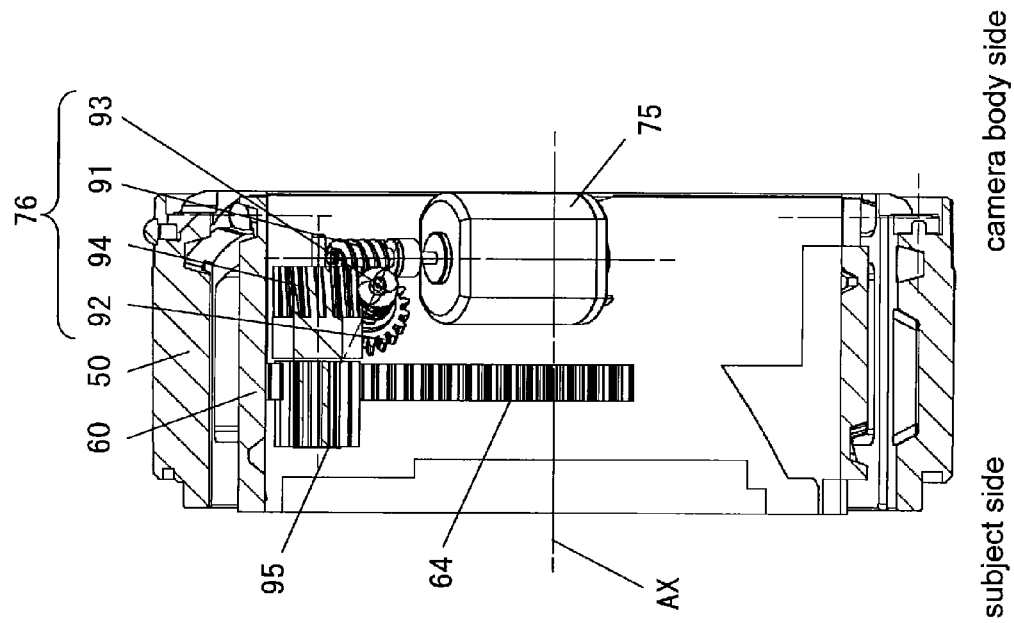
FIG. 9B is a detail view of the interior of the lens barrel 2.
Figure 9A:
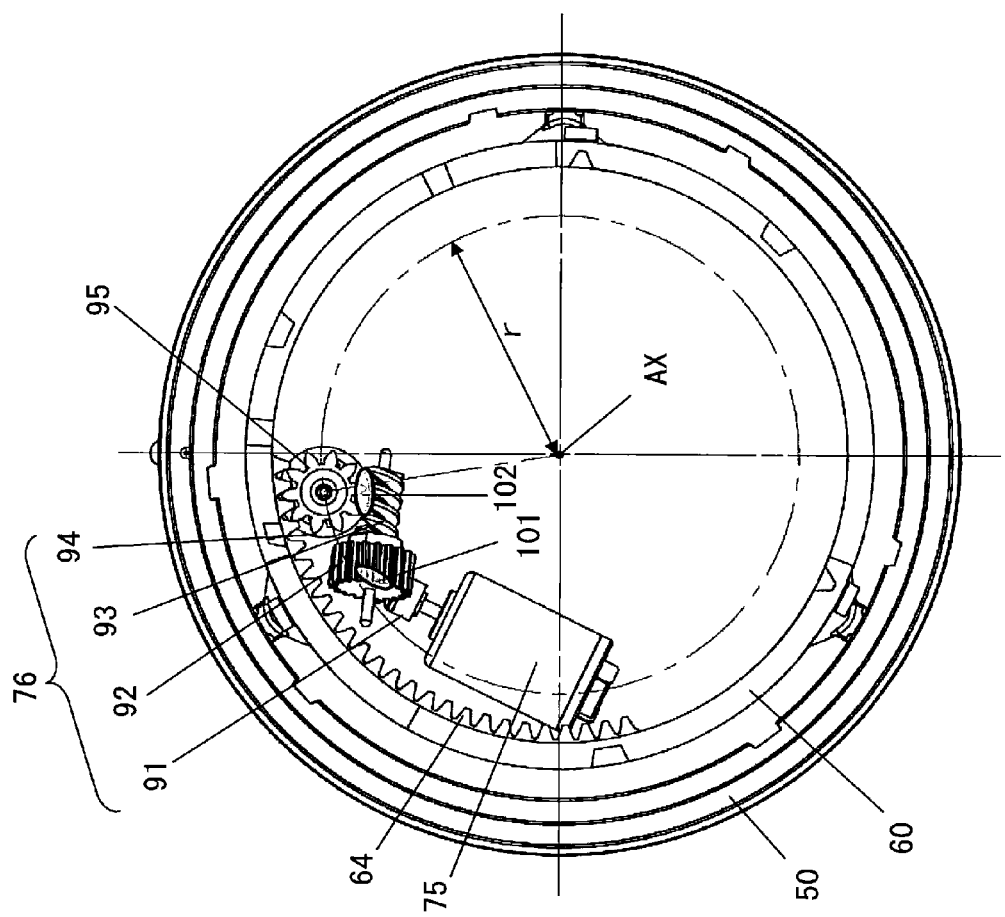
FIG. 9A is a detail view of the interior of the lens barrel 2.

FIGS. 9A and 9B are detail front and side views of the interior of the lens barrel 2 as seen from the subject side. The motor 75 and the transmission mechanism 76 are provided in the interior of the lens barrel 2. The transmission mechanism 76 is made up of a first worm gear 91, a first worm wheel 92, a second worm gear 93, and a second worm wheel 94. The first worm gear 91 is attached to the output shaft of the motor 75 and rotates integrally with the output shaft. The first worm gear 91 meshes with a meshing portion 101 of the first worm wheel 92. The first worm wheel 92 has a rotational axis that coincides with that of the second worm gear 93, and rotates integrally. The second worm gear 93 meshes with a meshing portion 102 of the second worm wheel 94. The second worm wheel 94 has a rotational axis that coincides with that of a drive gear 95, and rotates integrally. The drive gear 95 meshes with the gear portion 64, and the drive force of the motor 75 is transmitted through the transmission mechanism 76 to the cam frame 60.

The meshing portions 101 and 102 are disposed on the inside of a circle whose radius is a distance r between the optical axis AX (the rotational center of the cam frame 60) and the rotational center of the drive gear 95, when the lens barrel 2 is viewed from the subject side. The first worm gear 91 is disposed at a location that is closer to the cam frame 60 than the second worm gear 93.

The gear portion 64, the first worm wheel 92, and the first worm gear 91 are disposed in that order starting from the subject side along the optical axis direction (see FIG. 9B).

Figure 10:
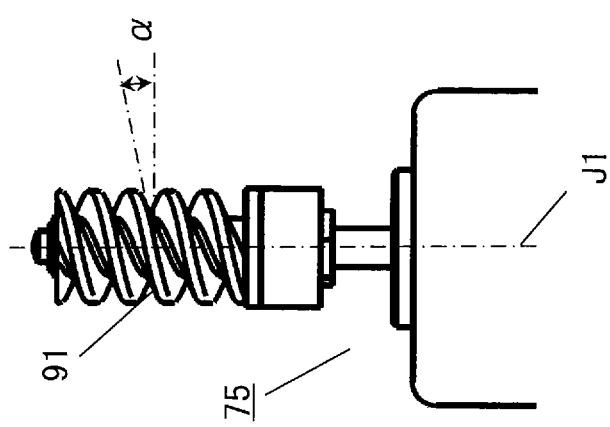
FIG. 10 is a detail view of a first worm gear 91.

FIG. 10 is a detail view of the first worm gear 91. As shown in FIG. 10, the first worm gear 91 has a lead angle α (e.g. 15.5°) and for example, has a modulus of 0.3. J1 is the rotational axis of the first worm gear 91.

Figure 11:
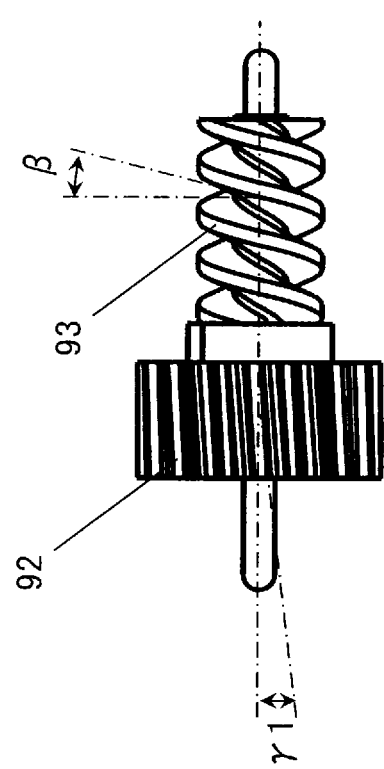
FIG. 11 is a detail view of a first worm wheel 92 and a second worm gear 93.

FIG. 11 is a detail view of the first worm wheel 92 and the second worm gear 93. As shown in FIG. 11, the first worm wheel 92 is a helical gear that has a lead angle γ (e.g. 4°) and for example, has a modulus of 0.3, while the second worm gear 93 has a lead angle β (e.g. 19.5°) and for example, has a modulus of 0.4.

Figure 12:
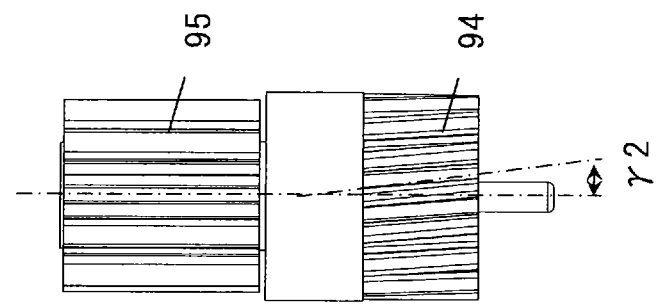
FIG. 12 is a detail view of a second worm wheel 94 and a drive gear 95.

FIG. 12 is a detail view of the second worm wheel 94 and the drive gear 95. As shown in FIG. 12, the second worm wheel 94 is a helical gear that has a lead angle γ (e.g. 5°) and a for example, has modulus of 0.4. The drive gear 95 is a spur gear that for example, has a modulus of 0.5.

Figure 13:
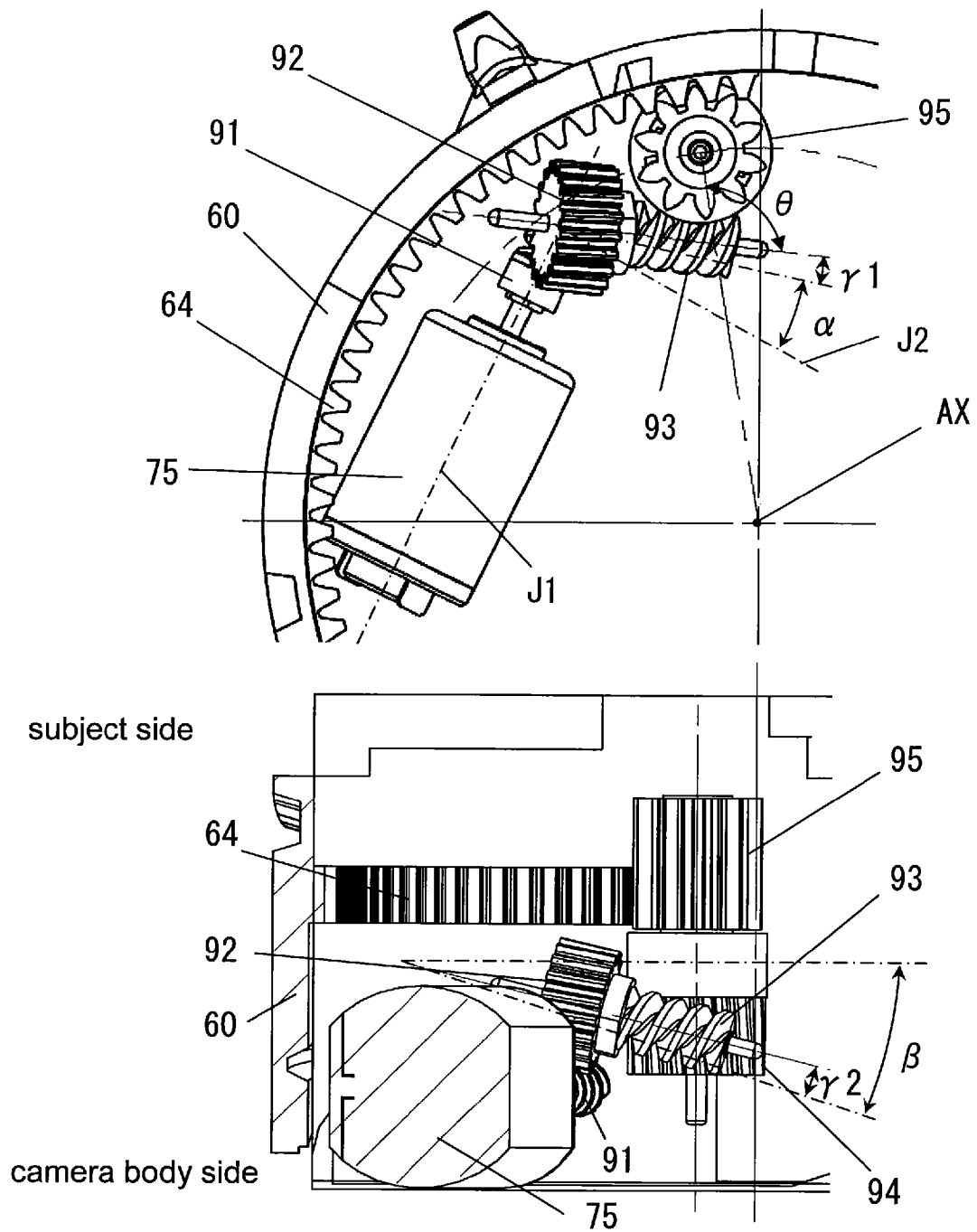
FIG. 13 is a detail view of the configuration of a transmission mechanism 76.

FIG. 13 is a detail view of the transmission mechanism 76. J2 is a straight line at a right angle to the rotational axis J1 of the first worm gear 91 in a plan view seen from the subject side. The inclination angle of the second worm gear 93 to the line J2 is an angle obtained by combining the lead angle α of the first worm gear 91 with the helical angle γ1 of the first worm wheel 92. Specifically, the inclination angle of the second worm gear 93 as seen from the subject side is set to be greater than when the first worm wheel 92 is a spur gear (with a lead angle of 0°). The obtuse angle θ formed by the rotational axis of the second worm gear 93 and a straight line connecting the rotational center of the drive gear 95 and the optical axis AX seen from the subject side is set within a range of 90°<θ≤110°. In this example, the obtuse angle θ is set to 105°.

As shown in FIG. 13, the inclination angle of the second worm gear 93 along the optical axis direction is set to be smaller than the lead angle β of the second worm gear 93 by the helical angle γ2 of the second worm wheel 94.

5. Conclusion (1) The lens barrel 2 in a mode of the present technology includes the outer frame 50, the cam frame 60, the motor 75, and the transmission mechanism 76. The lens barrel 2 supports a lens. The cam frame 60 is disposed more to the inner peripheral side than the outer frame 50, and is supported rotatably with respect to the outer frame 50. The motor 75 is disposed on the inside of the cam frame 60. The transmission mechanism 76 is disposed on the inside of the cam frame 60, and transmits the rotational force of the motor 75 to the cam frame 60.

Consequently, the motor 75 and the transmission mechanism 76 can be disposed on the inner peripheral side of the cam frame 60, so the lens barrel can be smaller in diameter.

(2) With the lens barrel 2 in a mode of the present technology, the meshing portions 101 and 102 of the transmission mechanism 76 are disposed near the inner peripheral part of the cam frame 60.

This means that fewer gears are needed for the transmission mechanism 76, and the lens barrel can be made more compact.

(3) The lens barrel 2 in a mode of the present technology includes the outer frame 50, the cam frame 60, the motor 75, and the transmission mechanism 76. The lens barrel 2 supports a lens. The cam frame 60 is disposed more to the inner peripheral side than the outer frame 50, and is supported rotatably with respect to the outer frame 50. The motor 75 rotationally drives the cam frame 60 with respect to the outer frame 50. The transmission mechanism 76 transmits the drive force of the motor 75 to the cam frame 60. The transmission mechanism 76 includes the drive gear 95 that rotates the cam frame 60. The meshing portions 101 and 102 of the transmission mechanism are disposed on the inside of a circle whose radius r is the distance from the rotational center of the cam frame 60 to the rotational center of the drive gear 95.

This allows the motor 75 and the transmission mechanism 76 to be disposed on the inner peripheral side of the cam frame 60, so the lens barrel can be smaller in diameter.

(4) With the lens barrel 2 in this embodiment, the transmission mechanism 76 further has the first worm gear 91, the first worm wheel 92, the second worm gear 93, and the second worm wheel 94. The first worm gear 91 is fixed to the rotary shaft of the motor 75. The first worm wheel 92 meshes with the first worm gear 91. The second worm gear 93 is formed integrally with the first worm wheel 92 and the rotational axis of the second worm gear 93 coinciding with rotational axis of the first worm wheel 92.

The second worm wheel 94 meshes with the second worm gear 93. The first worm wheel 92 is disposed more to the cam frame 60 side than the second worm gear 93.

Consequently, the transmission mechanism 76 can be configured in a form that conforms to the inner peripheral face of the cam frame 60. Accordingly, the second lens frame 22 and so forth on the inside of the transmission mechanism 76 can be disposed more efficiently, and the lens barrel 2 can be smaller in diameter.

(5) With the lens barrel 2 of this embodiment, the conditional formula "90°<θ≤110°" is satisfied when the obtuse angle θ formed by the rotational axis of the first worm wheel 92 and a straight line connecting the rotational center of the drive gear 95 and the rotational center of the drive gear 95 in a plane that is perpendicular to the rotational axis direction of the cam frame 60.

This allows the transmission mechanism 76 to be configured as efficiently and small as possible, and to be disposed within the cam frame 60.

(6) With the lens barrel 2 in this embodiment, the cam frame 60 has a gear portion 64 that protrudes to the inner peripheral side, the second worm wheel 94 and the drive gear 95 share a rotational axis, the drive gear 95 meshes with the gear portion 64, and the first worm wheel 92 is disposed between the gear portion 64 and the first worm gear 91 in the rotational axis direction of the drive gear 95. Consequently, the gear portion 64 can be made smaller in diameter without inference by the first worm wheel with the gear portion 64, so a smaller lens barrel 2 can be obtained.

(7) With the lens barrel 2 in this embodiment, the gear portion 64 is disposed more to the subject side than the first worm wheel 92, and the cam frame 60 is driven by the transmission mechanism 76 so as to be able to advance and retract along the optical axis direction. This makes it possible for the cam frame 60 and the gear portion 64 to be moved to the subject side during imaging, so that the overall length of the lens barrel when not imaging can be reduced just as when the amount of movement of the various lens groups is increased.

(8) With the lens barrel 2 in this embodiment, the first worm wheel 92 and/or the second worm wheel 94 is a helical gear. If the first worm wheel 92 is a helical gear, the inclination of the second worm gear 93 as seen from the subject side can be greater than the lead angle α of the first worm gear 91. This makes it possible for the obtuse angle θ to satisfy the conditional formula 90°<θ≤110°. Also, if the second worm wheel 94 is a helical gear, the inclination of the second worm gear 93 along the optical axis direction can be made less than the lead angle β of the second worm gear 93. This allows the height of the transmission mechanism 76 to be reduced along the optical axis direction, so the lens barrel 2 can be more compact.

(9) With the imaging device 1 in this embodiment, the above-mentioned lens barrel 2 is mounted to the camera body 3 that includes an imaging element that captures an optical image formed by the lens barrel 2 and converts it into image data. This affords a more compact imaging device 1.

OTHER EMBODIMENTS

The present technology is not limited to or by the embodiments given above, and various modifications and alterations are possible without departing from the gist of the technology.

Those portions having substantially the same function as the portions in the first and second embodiments discussed above will be numbered the same and will not be described again in detail.

(1) In the above embodiments, an imaging device was described by using the imaging device 1 as an example, but the imaging device is not limited to being the imaging device 1. For example, the imaging device 1 can capture both still and moving pictures, but the imaging device may be one that captures only still pictures, or one that captures only moving pictures.

(2) In the above embodiments, a lens barrel was described by using the lens barrel 2 as an example, but the lens barrel is not limited to being the lens barrel 2. For example, the lens barrel may be one that is used in an integrated type of imaging device, rather than an interchangeable lens barrel.

(3) In the above embodiments, the motor 75 was described as an example, but the motor 75 is not limited to being a DC motor, and may instead be another type of motor (such as a stepping motor).

(4) In the above embodiments, the transmission mechanism 76 was constituted by a worm gear and a worm wheel, but may instead be constituted by a spur gear.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device. Accordingly, these terms, as utilized to describe the present technology should be interpreted relative to the lens barrel and the imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

INDUSTRIAL APPLICABILITY

The lens barrel described above allows for a reduction in size, and is therefore useful in the field of imaging devices.

What is claimed is:

1. A lens barrel that supports a lens, comprising:
a first frame;
a second frame configured to be rotatably supported by the first frame;
a drive actuator disposed on the inside of the second frame; and
a transmission mechanism disposed on the inside of the second frame and configured to transmit a drive force of the drive actuator to the second frame.
2. The lens barrel according to claim 1, wherein:
a meshing part of the transmission mechanism is disposed near an inner peripheral part of the second frame.
3. The lens barrel according to claim 1, wherein:
the transmission mechanism includes a drive gear that rotates the second frame, and
a meshing part of the transmission mechanism is disposed within a range whose radius is the distance from the rotational center of the second frame to a rotational center of the drive gear.
4. The lens barrel according to claim 1, wherein:
the transmission mechanism further includes:
a first worm gear configured to be fixed to a rotary shaft of the drive actuator;
a first worm wheel configured to mesh with the first worm gear;
a second worm gear formed integrally with the first worm wheel, a rotational axis of the second worm gear coinciding with a rotational axis of the first worm wheel;
a second worm wheel configured to mesh with the second worm gear, wherein
the first worm wheel is disposed closer to a side of the second frame than the second worm gear.
5. The lens barrel according to claim 4, wherein:
the relational formula 90°<θ≤110° is satisfied, θ defined by an obtuse angle formed by the rotational axis of the first worm wheel and a straight line connecting a rotational center of the second frame and a rotational center of a drive gear.
6. The lens barrel according to claim 4, wherein:
the second frame includes a gear portion that protrudes to an inner peripheral side thereof,
a rotational axis of the second worm wheel and a rotational axis of a drive gear coinciding,
the gear portion is configured to mesh with the drive gear, and
the first worm wheel is disposed between the gear portion and the first worm gear along the rotational axis of the drive gear.
7. The lens barrel according to claim 6, wherein:
the gear portion is disposed closer to a subject side than the first worm wheel, and
the second frame is driven by the transmission mechanism so as to move along the optical axis direction.
8. The lens barrel according to claim 4, wherein:
at least one of the first worm wheel and the second worm wheel is a helical gear.
9. An imaging device, comprising:
the lens barrel according to claim 1; and
an imaging element configured to convert an optical image formed by the lens barrel into image data.

* * * * *